United States Patent [19]

Black

[11] Patent Number: 5,476,627
[45] Date of Patent: Dec. 19, 1995

[54] COMPOSITE MOLDING PROCESS UTILIZING TACKIFIED FABRIC MATERIAL

[75] Inventor: Marvin D. Black, Fort Worth, Tex.

[73] Assignee: Bell Helicopter Textron Inc., Fort Worth, Tex.

[21] Appl. No.: 265,249

[22] Filed: Jun. 24, 1994

[51] Int. Cl.⁶ .................................................... B29C 70/48
[52] U.S. Cl. ........................ 264/134; 156/291; 264/137; 264/257; 264/275
[58] Field of Search ...................... 264/275, 278, 264/257, 134, 135, 137, 258, 261; 156/244.11, 244.24, 242, 245, 291

[56] References Cited

U.S. PATENT DOCUMENTS

| | | | |
|---|---|---|---|
| 4,213,930 | 7/1980 | Goodrich et al. | 264/135 |
| 4,988,469 | 1/1991 | Reavely et al. | 264/258 |
| 4,992,228 | 2/1991 | Heck et al. | 264/137 |
| 5,080,851 | 1/1992 | Flonc et al. | 264/258 |
| 5,204,033 | 4/1993 | Pearce et al. | 264/137 |
| 5,271,986 | 12/1993 | Dublinski et al. | 428/156 |

FOREIGN PATENT DOCUMENTS

| | | | |
|---|---|---|---|
| 3234973 | 3/1984 | Germany | 264/257 |
| 62-62719 | 3/1987 | Japan | 264/257 |
| 62-275724 | 11/1987 | Japan | 264/257 |
| 846020 | 8/1960 | United Kingdom | 264/257 |

*Primary Examiner*—Robert B. Davis
*Attorney, Agent, or Firm*—Robert A. Felsman; Mark D. Perdue

[57] ABSTRACT

A quantity of fluid resin material is rendered into a flowable state without the use of solvents. The fabric then is beaded with at least one elongate bead of the flowable resin, wherein at least a portion of bead remains on the surface of the fabric to tackify the fabric and facilitate lay-up of the beaded fabric in the composite molding process. The fabric then is laid-up into a molding apparatus, wherein the bead adheres to surfaces in the molding apparatus and assists in positioning of the fabric therein. A further quantity of resin is disposed or injected under pressure into the molding apparatus and into contact with the fabric and contours of the mold. The resin then is cured to form the composite body.

19 Claims, 2 Drawing Sheets

COMPOSITE MOLDING PROCESS UTILIZING TACKIFIED FABRIC MATERIAL

BACKGROUND OF THE INVENTION

1. Field of the invention

The present invention relates generally to composite molding processes for forming composite bodies that include a fabric. More specifically, the present invention relates to a process and product for improving composite molding processes and the composite bodies resulting therefrom.

2. Background Information

A number of composite molding processes for forming composite bodies including a fabric are known. These processes, and the products resulting from them, find utility in the aerospace industry and other industries where parts of complex shape having the combination of high strength and low weight are advantageous.

One such composite molding process is resin transfer molding ("RTM"). In RTM precesses, a fabric material, such as fiberglass or woven carbon fibers, is placed on or laid-up in a die or mold tool having the contours of the desired part therein. After the fabric is laid-up in the molding tool, the tool is placed in a molding press in which a resin material is injected in a fluid state to impregnate and fill the fabric and cavities in the die or mold tool. After the resin is injected and cured, a composite body or part results that has excellent strength and generally low weight. RTM and similar composite molding processes also are very cost-effective.

If the die or molding tool possesses many contours, and particularly upstanding walls, the lay-up of the fabric in the mold, prior to the resin injection step, is rendered difficult because the dry fabric does not adhere the contours of the die or mold tool, particularly to upstanding surfaces. If the fabric is not laid-up properly, the resulting composite body will not possess adequate strength due to wrinkles or other imperfections in the laid-up fabric.

Prior-art solutions to this problem include tackifying, or rendering tacky, the fabric prior to the lay-up step of the composite molding process. Generally, use of an adhesive in the tackifying process that is chemically different from the resin ultimately injected in the composite molding process is unsatisfactory. This is because an adhesive having chemical and other properties different from that of the injection resin can degrade the strength of the cured resin and the resulting composite body.

As a general matter, most injection resins are too viscous in their uncured state to be applied to a fabric to provide a satisfactory tackifying material. Therefore, prior-art tackifying processes have employed the injection resin, thinned with an organic solvent such as acetone, as the tackifying adhesive. The resin, thinned with the organic solvent, is of a satisfactory consistency to provide tackification. However, as with adhesives chemically different from the injection resin, the organic solvent present in the tackifying material degrades the cured resin and the strength of the resulting composite body.

A prior-art alternative to the use of solvent with the injection resin as a tackifier is to provide the injection resin treated in such a manner that it is a fine powder. This powder can be applied to the fabric and serves as a tackifying adhesive. Once such product is and sold under the tradename AMD, sold by 3M Corporation of St. Paul, Minn. This product is a derivative of, and therefore chemically and otherwise compatible with, the injection resin sold under the tradename PR500 epoxy resin, also manufactured by 3M Corporation of St. Paul, Minn. However, because the AMD product is in a fine, powdered form, it becomes airborne easily, and could pose a respiratory health hazard. Currently, tackifying processes employing the AMD material are conducted in a controlled environment with all operators wearing cumbersome respirator equipment.

In addition to the inadequacy of prior-art tackifying materials, the processes employed in applying the tackifying material to the fabric have been less than satisfactory. In prior-art processes, the tackifying material was applied by manual painting or spraying. These prior-art processes allow little or no control over the amount of tackifying material being applied to the fabric. Moreover, spraying the tackifying material causes it to become airborne, increasing the risk of a respiratory health hazard.

A need exists, therefore, for a process for tackifying fabric for use in a composite molding process that employs the unadulterated injection resin as the tackifying material and that controls the amount of tackifying composition applied to the fabric. A need also exists for a tackified fabric for use in composite molding processes.

SUMMARY OF THE INVENTION

It is a general object of the present invention to provide a composite molding process for forming composite bodies including a fabric, wherein the fabric is rendered tacky by application of the injection resin to the fabric. It is a further object of the present invention to provide an improved tackified fabric for use in a composite molding process.

These and other objects of the present invention are achieved by rendering a quantity of fluid resin material in a flowable state without the use of solvents. The fabric then is beaded with at least one elongate bead of the flowable resin, wherein at least a portion of bead remains on the surface of the fabric to tackify the fabric and facilitate lay-up of the beaded fabric in the composite molding process. The fabric then is laid-up into a molding apparatus, wherein the bead adheres to surfaces in the molding apparatus and assists in positioning of the fabric therein. A further quantity of resin is disposed or injected under pressure into the molding apparatus and into contact with the fabric and contours of the mold. The resin then is cured to form the composite body.

According to a preferred embodiment of the present invention, the beading step is accomplished by conveying the fabric past a beading apparatus that includes a plurality of spaced-apart beading apertures, wherein the flowable resin is extruded onto and applied to the fabric in a plurality of spaced-apart, parallel beads.

According to a preferred embodiment of the present invention, the resin is a single-part epoxy manufactured by 3M corporation of St. Paul, Minn. and sold under the tradename PR500. The fabric may be fiberglass or carbon fibers.

According to a preferred embodiment of the present invention, prior to the laying step, a sheet of protective material is disposed over the beaded surface of the fabric, thereby protecting the beads and providing a tackified material for subsequent use in a composite molding process.

DESCRIPTION OF THE PREFERRED EMBODIMENT

Figure 1:
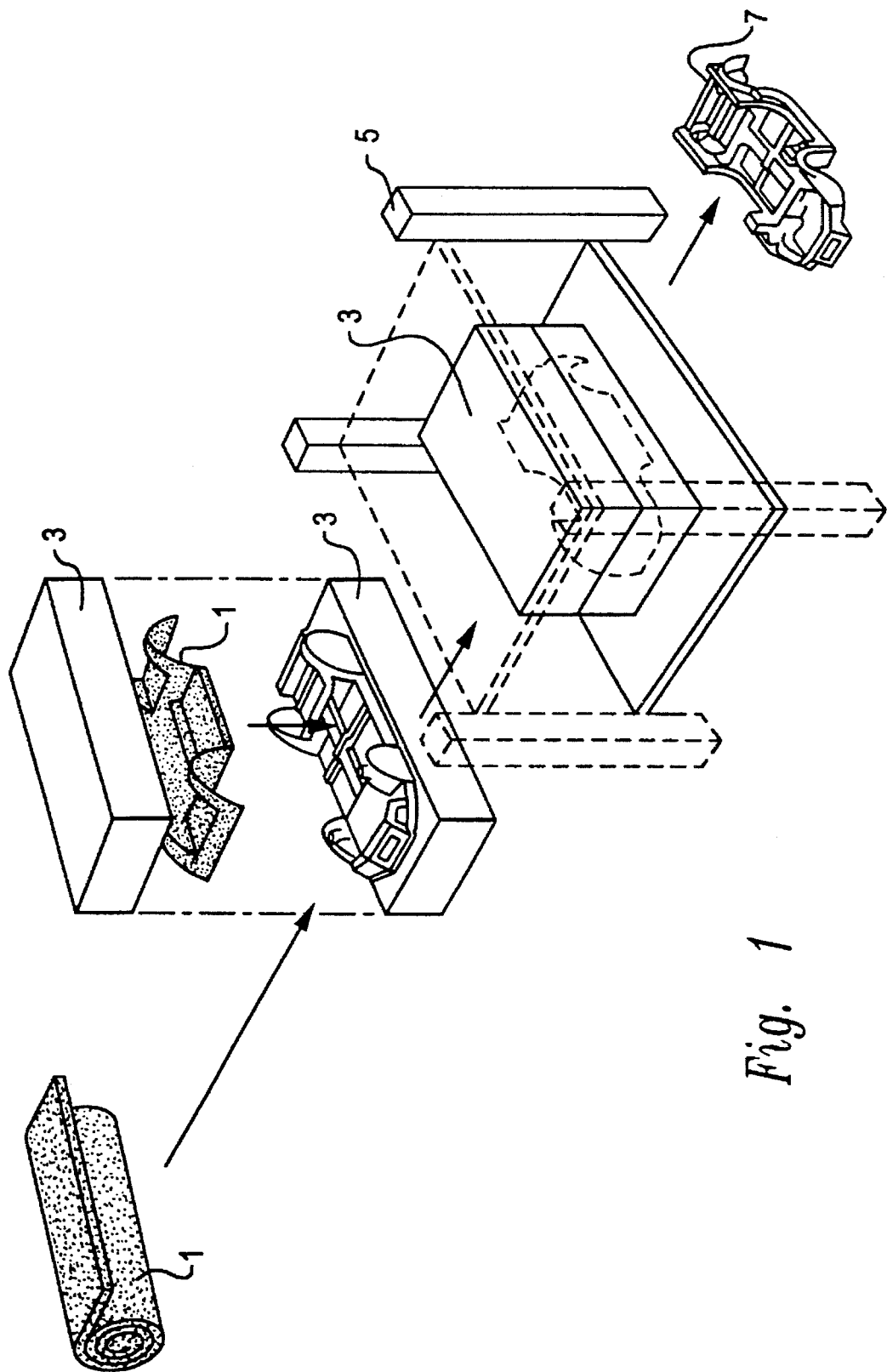
FIG. 1 is a schematic representation of a composite molding process of the type contemplated by the present invention.

Referring now to FIG. 1, a composite molding process of the type contemplated by the present invention is schematically illustrated. The molding process illustrated is commonly known as resin transfer molding ("RTM"), but the process and product according the present invention have utility in a number of composite molding processes that are similar in many respects to RTM. In the composite molding process illustrated, a quantity of reinforcing fabric 1, typically fiberglass or woven graphite or carbon fibers is provided. The fabric is laid-up into a die or mold tool 3, which contains the contours and surfaces of the final, finished part or composite body resulting from the process. Often, fabric 1 is laid-up into mold tool 3 in plys of varying shape and dimension to achieve a composite part or structure having a particular shape or strength characteristic. Once fabric i is laid-up in mold tool 3, the mold tool 3 is placed in a low-pressure molding press 5. A resin then is injected into mold tool 3 to impregnate fabric 1 and fill cavities in mold tool 3. The resin then is permitted to cure, and mold tool 3 is opened to reveal a finished composite body or part 7.

If mold tool 3 possesses complicated geometry and especially upstanding walls, the step of laying-up fabric 1 in mold tool 3 can become quite difficult. If fabric 1 is not tackified or rendered tacky, it is quite difficult to obtain a wrinkle-free lay-up and to maintain fabric 1 in close contact with upstanding or convoluted surfaces of mold tool 3.

Figure 2:
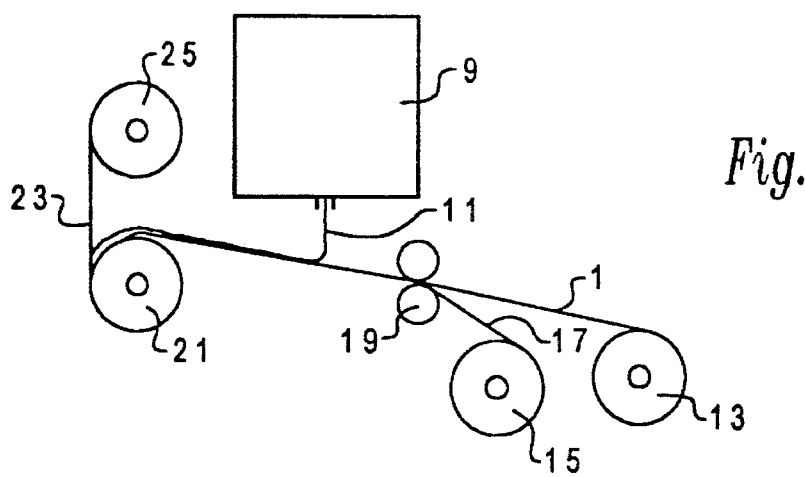
FIG. 2 is a side elevation view of the apparatus employed in practicing the process of the present invention.
Figure 3:
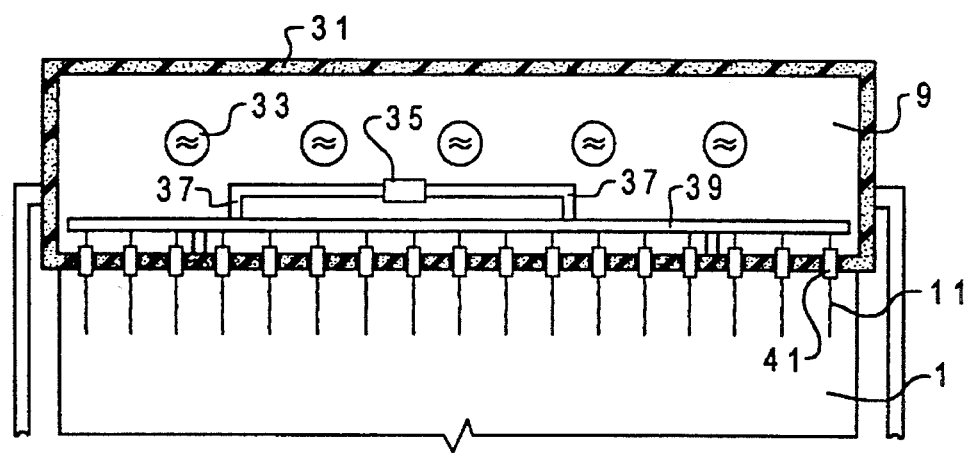
FIG. 3 is a front elevation view, partially in section, of the apparatus of FIG. 2.

FIGS. 2 and 3 are side and front elevation views, respectively, of the apparatus employed in the process according to the present invention. In accordance with the process of the present invention, fabric 1 is conveyed past a beading apparatus 9 wherein beads of resin 11 are formed and applied to a surface of fabric 1. The conveying apparatus include a supply roll of fabric 13 and a supply roll 5 of protective material 7, such as polyethylene film that is of the same width or wider than fabric . Protective material 17 is applied to the underside of fabric at pinch roller 9. Fabric 1 and protective material 17 then are conveyed past beading apparatus 9, which deposits or extrudes onto fabric 1 at least one bead 11 of flowable resin material substantially identical to that used subsequently in the composite molding process. Beaded fabric then is rolled on take-up roll 21 and another sheet of protective material 23 from another supply roll 25 is placed over the upper, beaded surface of fabric 1. The beaded fabric resulting from the process then may be stored, in conditions suitable for the uncured resin forming beads 11, for future use in the composite molding process.

According to a preferred embodiment of the present invention, the resin of which beads 11 are formed is a single-part epoxy resin sold under the tradename PR500 and manufactured by 3M Corporation of St. Paul, Minn. PR500 is preferred in aerospace applications because it has good cured strength and is easily handled in the molding process. PR500 is chosen not for its characteristics as a tackifier, but because it is the preferred resin used in the injection step ("injection resin") of the RTM process contemplated by the present invention. Other resins may be appropriate in the injection step, and thus may be used in the beading step according to the present invention.

With reference to FIG. 3, the construction of beading apparatus 9 is described in detail. Beading apparatus 9 comprises an insulated cabinet or housing 31. A plurality of infrared lamps 33 are provided on the interior of housing 31. A control valve 35 is disposed within housing 31 and is connected to a resin extrusion pump (not shown) of the type commonly used to inject resin in a mold apparatus. A preferred resin extrusion pump is manufactured by Venus-Gusmer and sold under the tradename RAM. Valve 35 serves as a means to selectively commence or halt operation of beading apparatus 9. A pair of 0.375 inch O.D. copper feeder lines 37 extend from valve 35 into fluid communication with a beading tube 39.

Beading tube 39 is constructed of 0.250 inch O.D. copper tubing that is plugged at both ends. Beading tube 39 is approximately as long as the width of fabric 1, preferably 42 inches. A plurality of beading apertures 0.031 inch in diameter are spaced apart at approximately 1.5 inch intervals along the length of beading tube 39. Resin is extruded through these apertures to form beads 11. Beads 11 exit cabinet 31 through 0.750 inch diameter apertures that are lined with removable sleeves 41. Removable sleeves 41 are provided so that they may be easily replaced if occluded with resin material during operation.

Cabinet 31 is provided to enclose beading tube 39 and related equipment to maintain them, and the resin flowing therethrough, at a temperature at which the uncured resin is flowable. At room temperature (72° F.), the PR500 resin has a viscosity of approximately 100,000 centipoise, which is too viscous to permit beading according to the present invention. Infrared lamps 33 serve to maintain the temperature inside cabinet at approximately 200° F. Maintenance of the PR500 resin at approximately 200° F. in the RTM pump (not shown) and within cabinet 31 renders the PR500 resin into a flowable state in which it may be extruded to form beads 11 according to the present invention.

Most resins employed in composite molding processes, like PR500, are too viscous at room temperature to permit beading with the resin. Depending on the resin employed, temperatures differing from those set forth above may be appropriate to render the resin into a flowable state for beading fabric according to the process of the present invention.

As is readily understood, the speed of conveyance of fabric 1 past beading apparatus 9, together with the dimension of apertures in beading tube 39, will dictate the dimension of beads 11. Preferably, beads 11 are approximately 0.040 to 0.050 inch in width and no less than about 0.030 inch in width. These bead dimensions can be obtained employing the foregoing aperture dimensions and a fabric velocity of approximately 20 feet per minute relative to beading apparatus 9.

Figure 4:
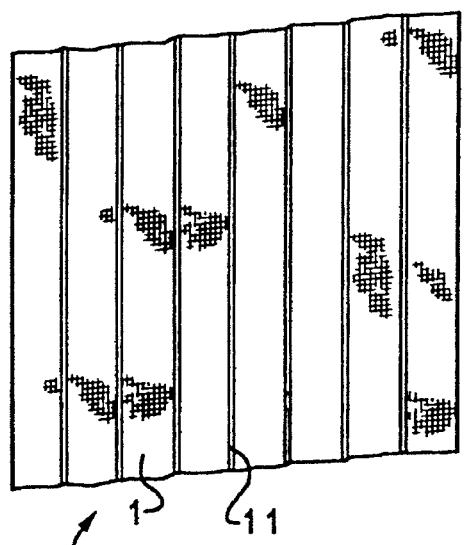
FIG. 4 depicts the tackified fabric resulting from the process according to the present invention.

FIG. 4 depicts beaded fabric 100 according to the present invention. Beaded fabric 100 include a plurality of generally parallel, spaced-apart, elongate beads 11 on the upper surface thereof. Beads 11 are maintained on the surface of fabric 1 (rather than impregnating or being absorbed by fabric) to provide an adhesive or tackifying material to facilitate lay-up of fabric in mold tools of complex shape (3 in FIG. 1). Beads of resin 11 preferably are continuous and extend the length of fabric 1, and are spaced apart approximately 1.5 inch.

Figure 5:
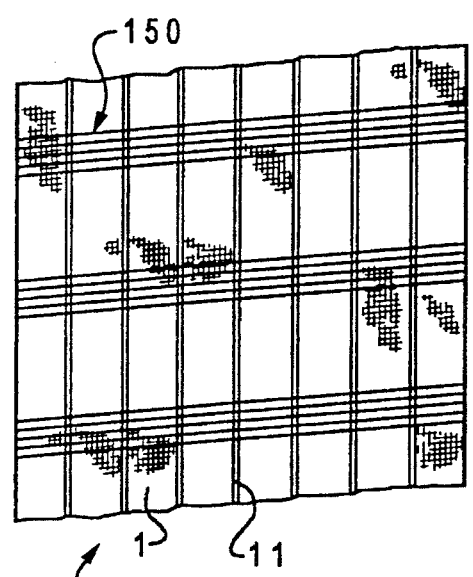
FIG. 5 illustrates the fabric of FIG. 4 in another embodiment of the present invention.

FIG. 5 depicts beaded fabric 100 according to another embodiment of the present invention. Commonly assigned U.S. Pat. No. 5,324,563, discloses pultruded rods formed of resin and carbon fiber that have compressive strength vastly improved over the prior art. Among other uses, such rods are useful as reinforcement in composite bodies formed by composite molding processes. Such rods typically are laid-up between plys of fabric to form a "sandwich" construction.

It has been found that pultruded rods must be maintained slightly spaced-apart during the lay-up step and in the resulting composite body. If the rods are not slightly spaced-apart, but are in contact, the friction between the rods degrades their strength and that of the composite body.

Beaded fabric 100 provides an excellent aid for laying-up pultruded rods 150. Simply by laying rods 150 on the beaded surface of fabric, wherein rods 150 intersect beads 11, temporarily secures rods 150 to beaded fabric 100. By gently pressing rods 150 into resin beads 11, resin extrudes between rods 150 and insures that rods 150 are spaced apart sufficiently to insure their proper function. Beaded fabric 100 and rods 150 then may be laid-up conventionally and beads 11 serve to facilitate the lay-up step.

The process and product according to the present invention possess a number of advantages. Specifically, the present invention facilitates composite molding processes involving complex shapes and/or incorporating pultruded rods without degrading the resulting composite body.

The invention has been described with reference to preferred embodiments thereof. It is thus not limited, but susceptible to variation and modification without departing from the scope of the invention.

I claim:

1. A composite molding process for forming composite bodies that include a fabric, the process comprising:

rendering a quantity of resin into a flowable state without the use of solvents;

beading a surface of the fabric with at least one elongate bead of the flowable resin, wherein at least a portion of the bead remains on the surface of the fabric to tackify the fabric and facilitate lay-up of the beaded fabric in the composite molding process;

laying the beaded fabric into a molding apparatus, wherein the bead adheres to surfaces in the molding apparatus and assists in positioning of the fabric therein;

disposing a further quantity of the resin under pressure into the molding apparatus and into contact with the fabric; and curing the resin to form the composite body.

2. The process according to claim 1 wherein the beading step further comprises:

conveying the fabric past an extrusion apparatus including a plurality of spaced-apart extrusion apertures, wherein the flowable resin is extruded onto and applied to the fabric in a plurality of spaced-apart, parallel beads.

3. The process according to claim 1 wherein the resin is an epoxy.

4. The process according to claim 1 wherein the fabric is fiberglass.

5. The process according to claim 1 wherein the fabric is woven of carbon fibers.

6. The process according to claim 1 wherein further comprising the step of:

prior to the laying step, laying at least one pultruded rod on the surface of the beaded fabric and in contact with the bead, the pultruded rod being generally at an angle relative to the bead.

7. The process according to claim 1 wherein the resin is heated to the flowable state.

8. The process according to claim 1 further comprising the step of covering the surface of the beaded fabric with a sheet of protective material.

9. A composite molding process for forming composite bodies including a fabric material, the process comprising:

heating a quantity of resin to a flowable state in an extruding apparatus including a plurality of spaced-apart apertures;

conveying the fabric past the apertures in the extruding apparatus; and extruding the flowable resin through the apertures in the extruding apparatus and onto a surface of the fabric to form a plurality of spaced-apart, generally parallel, elongate beads, wherein at least a portion of the beads remains on the surface of the fabric;

laying the beaded fabric into a molding apparatus, wherein the beads adhere to surfaces of the molding apparatus and assist in positioning of the fabric therein;

injecting a further quantity of the resin under pressure into the molding apparatus and into contact with the fabric; and curing the resin to form the composite body.

10. The process according to claim 9 wherein the resin is an epoxy.

11. The process according to claim 9 wherein the fabric is fiberglass.

12. The process according to claim 9 wherein the fabric is woven of carbon fibers.

13. The process according to claim 9 further comprising the step of:

prior to the laying step, laying at least one pultruded rod on the surface of the beaded fabric and in contact with and intersecting the beads.

14. The process according to claim 9 further comprising the step of covering the surface of the beaded fabric with a sheet of protective material.

15. A composite molding process for forming composite bodies of a fabric material, the process comprising:

rendering a quantity of resin into a flowable state without solvents in an extruding apparatus including a plurality of spaced-apart apertures;

conveying the fabric past the apertures in the extruding apparatus; and extruding the flowable resin through the apertures in the extruding apparatus and onto a surface of the fabric to form a plurality of spaced-apart, generally parallel, elongate beads, wherein at least a portion of the beads remains on the surface of the fabric;

laying at least one pultruded rod on the surface of the beaded fabric and in contact with and intersecting at least one of the beads;

laying the beaded fabric into a molding apparatus, wherein the bead adhere to surfaces of the molding apparatus and assist in positioning of the fabric therein;

injecting a further quantity of the resin under pressure into the molding apparatus and curing the resin to form the composite body.

16. The process according to claim 15 wherein the resin is an epoxy.

17. The process according to claim 15 wherein the fabric is fiberglass.

18. The process according to claim 15 wherein the fabric is formed of carbon fibers.

19. The process according to claim 15 further comprising the step of covering the surface of the beaded fabric with a sheet of protective material.

* * * * *